Patented Nov. 7, 1933

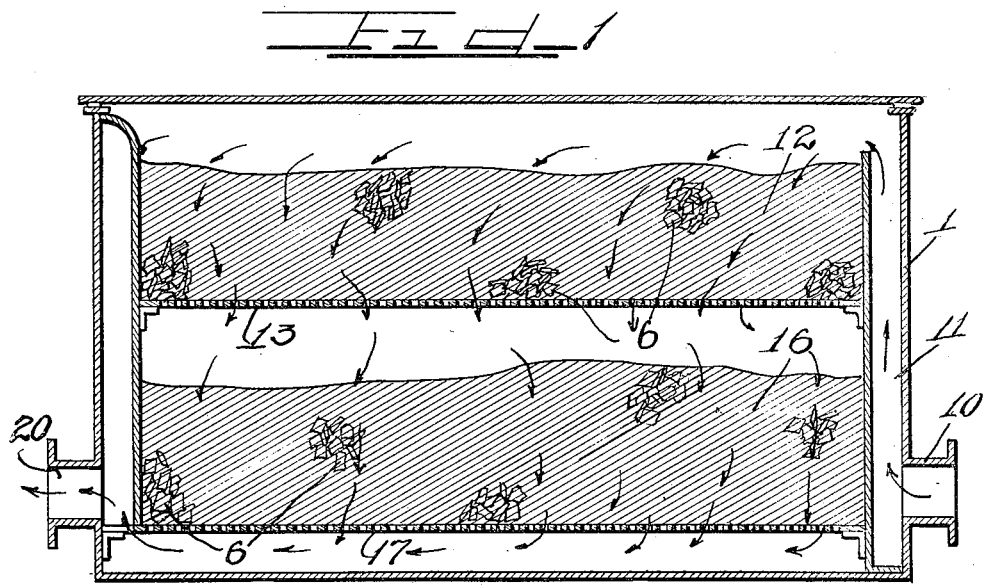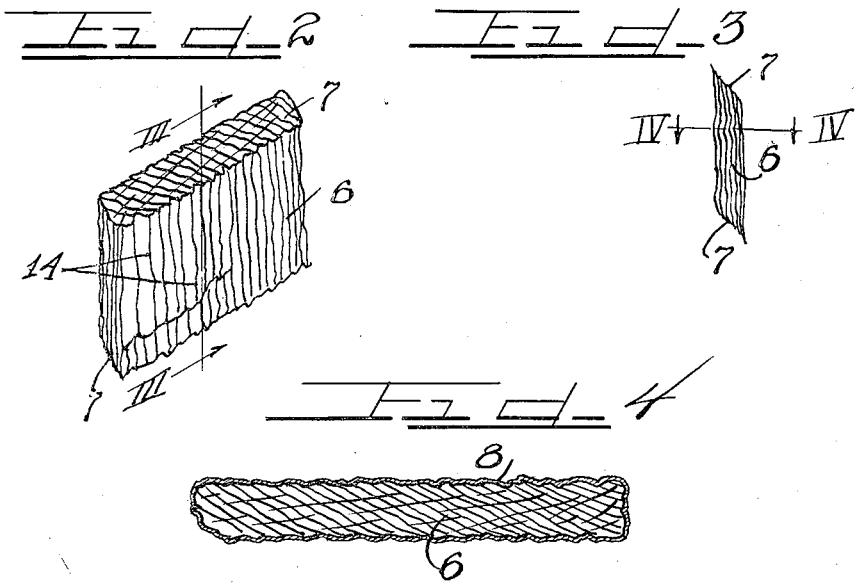

1,934,242

UNITED STATES PATENT OFFICE 1,934,242

PURIFICATION OF GAS

Arthur L. Smyly, Chicago, Ill.

Application October 31, 1931. Serial No. 572,329

2 Claims. (Cl. 23—3)

This invention relates to novel substances for use in purifying gas and includes a process of gas purification.

More specifically this invention relates to rigid wood chips coated and admixed with an iron compound and a process of using said chips for purifying gases containing sulphur impurities.

In the purification of illuminating gases or gases used for heating purposes it has been heretofore a practice to remove sulphur impurities, such as hydrogen sulphide and the like, from the gas by means of hydrated ferric oxide. The iron oxide generally used is natural bog iron ore ($Fe_2O_3.3H_2O$) although other oxides may also be used. Hydrogen sulphide, for example, is converted into iron sulphide and sulphur most probably according to the following equations:

(1) $Fe_2O_3.3H_2O + 3H_2S — 2FeS + S + 6H_2O$
(2) $Fe_2O_3.3H_2O + 3H_2S — Fe_2S_3 + 6H_2O$

It has also been proposed to admix the iron oxide with sawdust to render it more porous so that the gas may be readily passed through purifiers containing beds of the iron oxide.

The use of a sawdust-iron oxide mixture has not been entirely satisfactory due to the fact that when such a mixture is inserted into the customary purifiers in beds varying in depth from about 3 to 6 feet the bulky mixture tends to pack, forming a dense almost solid mass at the bottom of the bed. The gas to be purified upon coming into contact with the mixture thus readily passes through the porous loose bed at the top but meets with great resistance in forcing its way through the densely packed mass at the bottom of the bed. Besides necessitating the use of extra power to propel the gas, the dense mass also causes uneven sulphur extraction since a greater absorption takes place at the denser portions of the bed, which further aid in the building up of a solid mass. In practice the densely packed mass at the bottom of the purifying bed actually causes the gas to channel through the bed in paths offering the least resistance to its flow. This results in low purification efficiency.

Other materials such as excelsior, wood shavings, corn cobs and other cellulosic materials have been proposed in place of sawdust. However these materials present little or no advantage over the use of sawdust and in addition some of them have other disadvantages. Wood shavings and excelsior pack equally as much as does sawdust and are more difficult to admix with the iron oxide. Cellulosic materials such as corn cobs and straw tend to ferment in the gas purifier and are not at all satisfactory for commercial installation.

I have now found a cheap, commercially available form of substance that can be readily admixed and coated with the iron oxide to produce a filter bed which does not pack, permit channeling, decompose or allow uneven absorption of the sulphur impurities at different levels in the purifier bed.

According to my invention I utilize the ordinary wood chips fed to the digesters which are produced by a chipping machine in the manufacture of wood pulp for the paper industry. These chips are cut from the logs at an angle to the grain of the wood, are about three-fourths to one and one-half inches in length and are generally broken with the grain so that pieces not greater than two inches in width result.

It is therefore an object of my invention to utilize rigid wood chips admixed and coated with an iron oxide in the purification of gases containing sulphur impurities.

It is a further object of this invention to purify gases containing odoriferous sulphur impurities by passing the gases through a bed of rigid wood chips admixed and coated with an iron oxide.

Other and further objects of this invention will become apparent as the description proceeds.

On the drawing:

Figure 1 is a cross sectional view of a gas purifier showing the two filter beds in elevation.

Figure 2 is a perspective view of an average chip used according to the invention.

Figure 3 is a cross sectional view of the wood chip shown in Figure 2 taken along the line III—III.

Figure 4 is a sectional view taken along the line IV—IV of Figure 3 showing the chip coated with an iron oxide compound.

As shown on the drawing:

In Figure 1 the reference numeral 1 indicates a gas purifier in which the foul gas inserted at 10, is directed through the passage 11 above the top filter bed 12. The filter bed 12 is supported by means of a perforated plate 13 and is composed of wood chips 6 as shown in Figures 2 to 4 coated and admixed with an iron oxide. The filter bed 12 is generally about 3 to 6 feet in depth and is of practically uniform density throughout.

A second filter bed 16 composed of chips 6 is positioned directly below the filter bed 12. The filter bed 16 is supported on a perforated plate 17 in the same manner as the upper filter bed. The gases after passing through the filter beds 12 and 16 are allowed to emerge from the purifier at 20.

While two filter beds have been shown in superimposed relation it is apparent to those skilled in the art that any number of filter beds may be used in a purifier unit. With the construction shown in Figure 1 however it is possible to readily remove the filter beds when they have become spent and inactive through absorption of sulphur. The beds are generally removed from the purifier and spread in layers of a foot or more in depth where the air can act upon them. The iron sulphides are acted upon by the oxygen of the air to reproduce the iron oxide. Most probably the following reactions are involved:

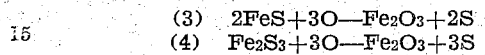

(3) $2FeS + 3O \rightarrow Fe_2O_3 + 2S$
(4) $Fe_2S_3 + 3O \rightarrow Fe_2O_3 + 3S$ If desired, however, the beds may be revivified while still in the purifying chamber by passing air or oxygen through the beds in place of the foul gas.

In Figure 2 the reference numeral 14 represents the grain of the wood chip 6 which as shown is parallel to the length of the chip as produced by the ordinary chipping machine in the paper pulp industry. The chipping machine contains rotary blades which bite into the log being chipped at an angle so that the nip or bite of the chip is less than 90° to the grain as shown more clearly in Figure 3 wherein the numeral 7 represents the ends of the chip. These ends of the chip are not crushed by the knives of the machine and are open and porous.

In Figure 4 the reference numeral 8 indicates the iron oxide coating on the paper pulp wood chip.

As stated above these paper pulp wood chips are generally from ¾ to 1½ inches long. In practice it is preferred to screen them so that any chips shorter than ⅜ths of an inch are removed.

Any iron oxide containing material may be used in place of the bog iron ore suggested above. If the iron oxide material contains lime it has been found that the lime acts as an adhesive for the iron oxide and aids in coating the chips. The lime furthermore aids in the removal of sulphur impurities from the gas forming calcium sulphides.

The chips are generally made from cheap soft woods ordinarily used in the paper pulp industry, such as hemlock, spruce, pine and the like. Hardwood, because of its acid character, is not very desirable.

In preparing the wood chips for the filter beds I find it advantageous to admix the iron oxide containing material with water and apply the moistened material to the wood chips. In this manner the iron oxide material adheres to the wood and forms a coating thereon. The rigid chips so moistened do not readily dry out as does the more finely comminuted sawdust and cellulosic fillers heretofore used. For example I may use from about 15 to 20 parts, by weight, of wood chips with 20 to 30 parts of iron oxide material and about 8 to 12 parts of water. The mass, in this proportion, is mixed together until the chips are uniformly coated.

I prefer, as a specific mixture, to use the ingredients in about the following proportions: 18 parts by weight of wood chips, 10 parts by weight of water, 25 parts by weight of hydrated ferric oxide. This specific mixture weighs about 35 to 40 pounds per cubic foot and forms a filter bed which will not pack, channel or permit uneven absorption at different levels in the bed.

By the term "paper pulp wood chips" as used in the claims I mean those chips prepared by the ordinary chipping machine for use in the paper pulp industry, said chips having parallel ribbed surfaces following the grain of the wood and open grained ends transversely of the grain of the wood at angles less than 90° therefrom

I claim as my invention:

1. New articles of manufacture for use in purifying gas containing hydrogen sulphide impurities comprising rigid paper pulp wood chips having parallel ribbed surfaces following the grain of the wood and open grained ends transversely of the grain of the wood coated with an iron oxide compound, said wood chips being of substantial thickness, averaging about ¾ to 1½ inches in length, not greater than about 2 inches in width, and substantially free from fine particles less than about ⅜ inches in size.

2. A filter bed for use in purifying gas containing hydrogen sulphide impurities comprising rigid paper pulp wood chips free from fine compactible particles, said rigid chips having parallel ribbed surfaces following the grain of the wood and open grained ends transversely of the grain of the wood coated with hydrated ferric oxide, being of substantial thickness to resist crushing and packing in the bed, averaging about ¾ to 1½ inches in length and not greater than about 2 inches in width.

ARTHUR L. SMYLY.